US006962227B1

(12) United States Patent
Kirkwood

(10) Patent No.: US 6,962,227 B1
(45) Date of Patent: Nov. 8, 2005

(54) TORQUE VECTORING DRIVE AXLE ASSEMBLY

(75) Inventor: Malcolm E. Kirkwood, Livonia, MI (US)

(73) Assignee: Magna Drivetrain of America, Inc., Troy, MI (US)

( * ) Notice: Subject to any disclaimer, the term of this patent is extended or adjusted under 35 U.S.C. 154(b) by 36 days.

(21) Appl. No.: 10/842,017

(22) Filed: May 7, 2004

(51) Int. Cl.[7] ............................................. B60K 17/354
(52) U.S. Cl. ........................ 180/245; 180/249; 475/249
(58) Field of Search ................................ 475/221, 248, 475/229; 180/249, 248

(56) References Cited

U.S. PATENT DOCUMENTS

| 4,677,873 | A | * | 7/1987 | Eastman et al. ............ 475/204 |
| 4,691,593 | A | | 9/1987 | Mueller |
| 4,757,728 | A | | 7/1988 | Pitsch |
| 4,763,747 | A | | 8/1988 | Muller |
| 5,046,998 | A | * | 9/1991 | Frost ........................... 475/221 |
| 5,057,062 | A | * | 10/1991 | Yamasaki et al. ........... 475/221 |
| 5,078,660 | A | * | 1/1992 | Williams et al. .............. 475/84 |
| 5,370,588 | A | | 12/1994 | Sawase et al. |
| 5,415,598 | A | | 5/1995 | Sawase et al. |
| 5,456,641 | A | | 10/1995 | Sawase |
| 5,545,103 | A | * | 8/1996 | Gustin ......................... 475/223 |
| 5,632,185 | A | | 5/1997 | Gassmann |
| 5,662,543 | A | * | 9/1997 | Forsyth ....................... 475/198 |
| 5,699,888 | A | | 12/1997 | Showalter |
| 5,904,634 | A | | 5/1999 | Teraoka |
| 5,910,064 | A | | 6/1999 | Kuroki |
| 5,911,291 | A | | 6/1999 | Suetake et al. |
| 5,989,146 | A | * | 11/1999 | Brown et al. ............... 475/207 |
| 6,120,407 | A | | 9/2000 | Mimura |
| 6,378,677 | B1 | | 4/2002 | Kuroda et al. |
| 6,394,246 | B1 | | 5/2002 | Gassmann et al. |
| 6,520,880 | B1 | | 2/2003 | Fukushima et al. |
| 6,533,090 | B2 | | 3/2003 | Osborn et al. |
| 6,612,956 | B2 | * | 9/2003 | Fukuno et al. .............. 475/199 |
| 6,616,566 | B2 | | 9/2003 | Gorlich |
| 6,645,108 | B1 | | 11/2003 | Gradu |
| 6,685,594 | B2 | * | 2/2004 | Kanazawa ................... 475/249 |
| 6,805,651 | B2 | * | 10/2004 | Lipman ....................... 475/221 |
| 6,824,487 | B2 | * | 11/2004 | Williams et al. ............. 475/204 |
| 6,862,953 | B2 | * | 3/2005 | Fitzgerald et al. ........ 74/665 G |
| 2004/0023743 | A1 | * | 2/2004 | Cook et al. ................ 475/249 |

FOREIGN PATENT DOCUMENTS

WO     WO 02/09966 A1    2/2002

* cited by examiner

*Primary Examiner*—Lesley D. Morris
*Assistant Examiner*—Marlon Arce-Diaz
(74) *Attorney, Agent, or Firm*—Harness, Dickey & Pierce P.L.C.

(57) ABSTRACT

A drive axle assembly includes a pair of axleshafts connected to a pair of wheels, and a drive mechanism for selectively coupling a driven input shaft to one or both of the axleshafts. The drive mechanism includes first and second drive units that can be selectively engaged to control the magnitude of the drive torque transferred and the relative rotary speed between the input shaft and the axleshafts. Each drive unit includes a planetary gearset disposed between the input shaft and its corresponding axleshaft, and a pair of mode clutches that may be activated to cause the planetary gearset to establish different speed ratio drive connections between the input shaft and the axleshaft. A control system including an electronic control unit (ECU) and sensors are provided to control actuation of the clutches so as to control the side-to-side traction characteristics of the drive axle assembly.

14 Claims, 6 Drawing Sheets

| DRIVE MODE | FIRST MODE CLUTCH | SECOND MODE CLUTCH | THIRD MODE CLUTCH | FOURTH MODE CLUTCH |
|---|---|---|---|---|
| 1ST | LOCKED | RELEASED | RELEASED | RELEASED |
| 2ND | RELEASED | LOCKED | RELEASED | RELEASED |
| 3RD | LOCKED | RELEASED | RELEASED | LOCKED |
| 4TH | LOCKED | RELEASED | LOCKED | RELEASED |
| 5TH | RELEASED | LOCKED | RELEASED | LOCKED |
| 6TH | RELEASED | RELEASED | LOCKED | RELEASED |
| 7TH | RELEASED | RELEASED | RELEASED | LOCKED |
| 8TH | RELEASED | LOCKED | LOCKED | RELEASED |
| 9TH | RELEASED | RELEASED | RELEASED | RELEASED |

FIG. 5

TORQUE VECTORING DRIVE AXLE ASSEMBLY

FIELD OF THE INVENTION

The present invention relates generally to axle assemblies for use in motor vehicles and, more specifically, to an axle assembly equipped with a torque vectoring drive mechanism and an active yaw control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control, as is disclosed in U.S. Pat. No. 6,378,677 and 5,699,888. According to an alternative drive axle arrangement, U.S. Pat. No. 6,520,880 discloses a hydraulically-operated traction distribution assembly.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which are equipped with an adaptive yaw and stability control system.

To achieve this objective, the drive axle assembly of the present invention includes a pair of axleshafts connected to a pair of wheels, and a drive mechanism that is operable to selectively couple a driven input shaft to one or both of the axleshafts. In particular, the drive mechanism includes first and second drive units that can be selectively engaged to control the magnitude of the drive torque transferred and the relative rotary speed between the input shaft and the axleshafts. Each drive unit includes a planetary gearset that is operably disposed between the input shaft and its corresponding axleshaft, and a pair of mode clutches that may be activated to cause the planetary gearset to establish different speed ratio drive connections between the input shaft and the axleshaft. Each mode clutch includes a multi-plate clutch pack and a power-operated actuator to control the engagement force applied to the clutch pack. A control system including an electronic control unit (ECU) and sensors are provided to control actuation of the clutches so as to control the side-to-side traction characteristics of the drive axle assembly.

Further objectives and advantages of the present invention will become apparent by reference to the following detailed description of the preferred embodiment and the appended claims when taken in conjunction with the accompanying drawings.

BRIEF DESCRIPTION OF THE DRAWINGS

The present invention will become more fully understood from the detailed description and the accompanying drawings, wherein:

FIG. 5 is a table listing the available operational drive modes established by the drive axle assembly of the present invention.

DETAILED DESCRIPTION OF THE PREFERRED EMBODIMENTS

Figure 1:
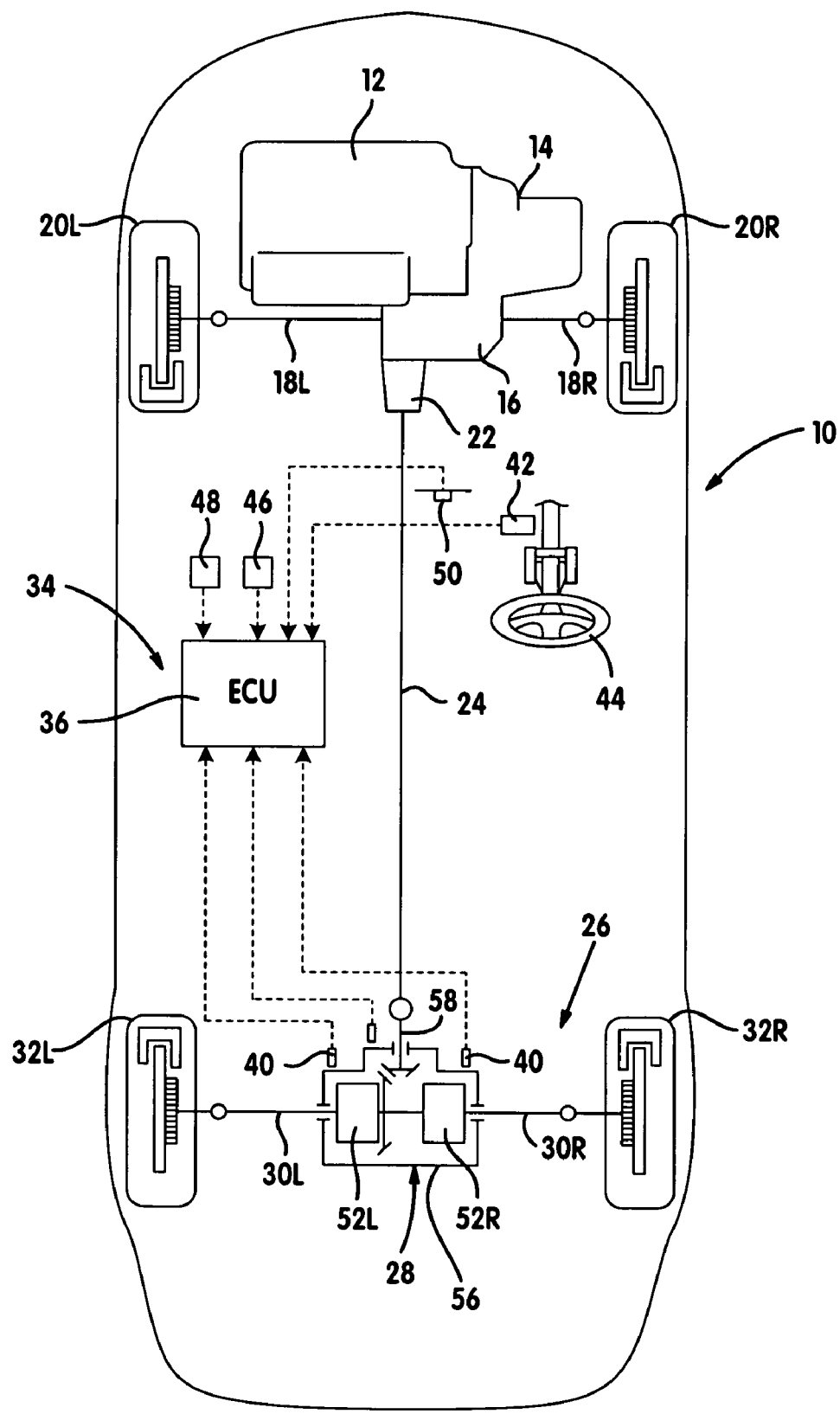
FIG. 1 is a diagrammatical illustration of a four-wheel drive motor vehicle equipped with the yaw and stability control system of the present invention.

Referring to FIG. 1, a four-wheel drive vehicle 10 includes an engine 12 horizontally mounted in a front portion of a vehicle body, a transmission 14 provided integrally with engine 12, a front differential 16 which connects transmission 14 to axle shafts 18L and 18R and left and right front wheels 20L and 20R, a power transfer unit ("PTU") 22 which connects front differential 16 to a propeller shaft 24, and a rear axle assembly 26 having a drive mechanism 28 which connects propeller shaft 24 to axleshafts 30L and 30R for driving left and right rear wheels 32L and 32R. As will be detailed, drive mechanism 28 is operable in association with a yaw control system 34 for controlling the transmission of drive torque through axleshafts 30L and 30R to rear wheels 32L and 32R. When the transmission of drive torque is cut off, vehicle 10 is brought into a front wheel drive (FWD) state in which only front wheels 20L and 20R are driven. In contrast, vehicle 10 is brought into a four-wheel drive (4WD) state wherein drive torque is transmitted to front wheels 20L and 20R and rear wheels 32L and 32R. Further, in the 4WD state, rear drive mechanism 28 is capable of varying the magnitude of drive torque to one or both of left and right rear wheels 32L and 32R to any extent.

In addition to an electronic control unit (ECU) 36, yaw control system 34 includes a plurality of sensors for detecting various operational and dynamic characteristics of vehicle 10. For example, a front wheel speed sensor 38 is provided for detecting a front wheel speed value based on rotation of propeller shaft 24, a pair of rear wheel speed sensors 40 are operable to detect the individual rear wheel speed values based rotation of left and right axle shafts 30L and 30R, and a steering angle sensor 42 is provided to detect a steering angle of a steering wheel 44. The sensors also include a yaw rate sensor 46 for detecting a yaw rate of the body portion of vehicle 10, a lateral acceleration sensor 48 for detecting a lateral acceleration of the vehicle body, and a lock switch 50 for permitting the vehicle operator to intentionally shift drive mechanism 28 into a locked mode. As will be detailed, ECU 36 controls operation of left and right drive units 52L and 52R associated with drive mechanism 28 by utilizing a control strategy that is based on input signals from the various sensors and lock switch 50.

Drive mechanism 28 includes a casing 56 within which left drive unit 52L and right drive unit 52R are located. As seen, an input shaft 58 is connected to propshaft 24 and extends into and is rotatably supported by casing 56. Input shaft 58 includes a pinion gear 60 in constant mesh with a ring gear 62 that is fixed for rotation with a transfer shaft 64. Left drive unit 52L is operably arranged to selectively transfer drive torque from transfer shaft 64 to left axleshaft 30L. Likewise, right drive unit 52R is operably arranged to selectively transfer drive torque from transfer shaft 64 to right axleshaft 30R. Since the left and right drive units are substantially mirror-imaged arrangements, only the components of left drive unit 52L will be described in detail with it understood that the common components are identified using "L" and "R" suffixes to designate "left" and "right".

Figure 2:
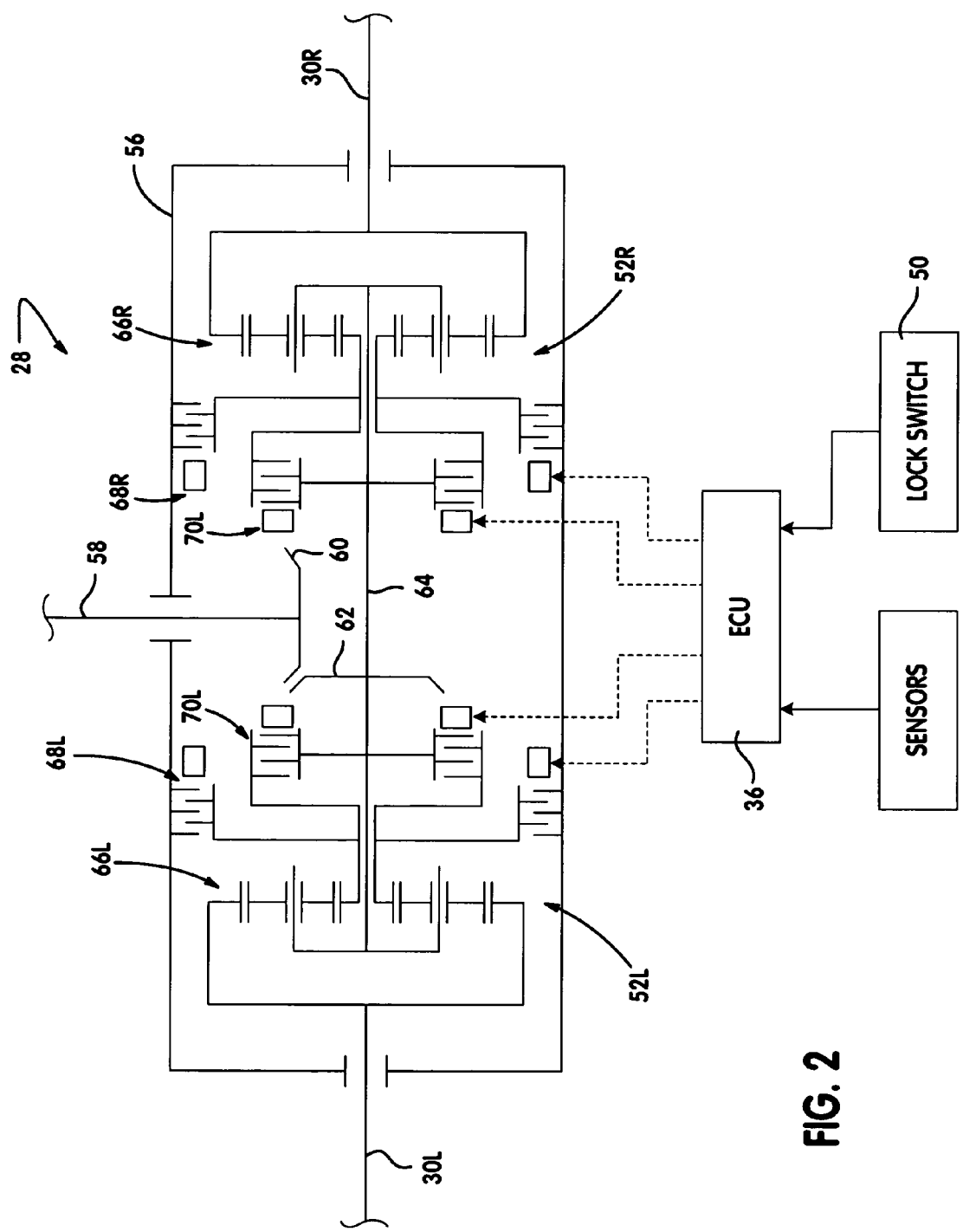
FIG. 2 is a schematic illustration of the drive axle assembly shown in FIG. 1 according to the present invention.
Figure 3A:
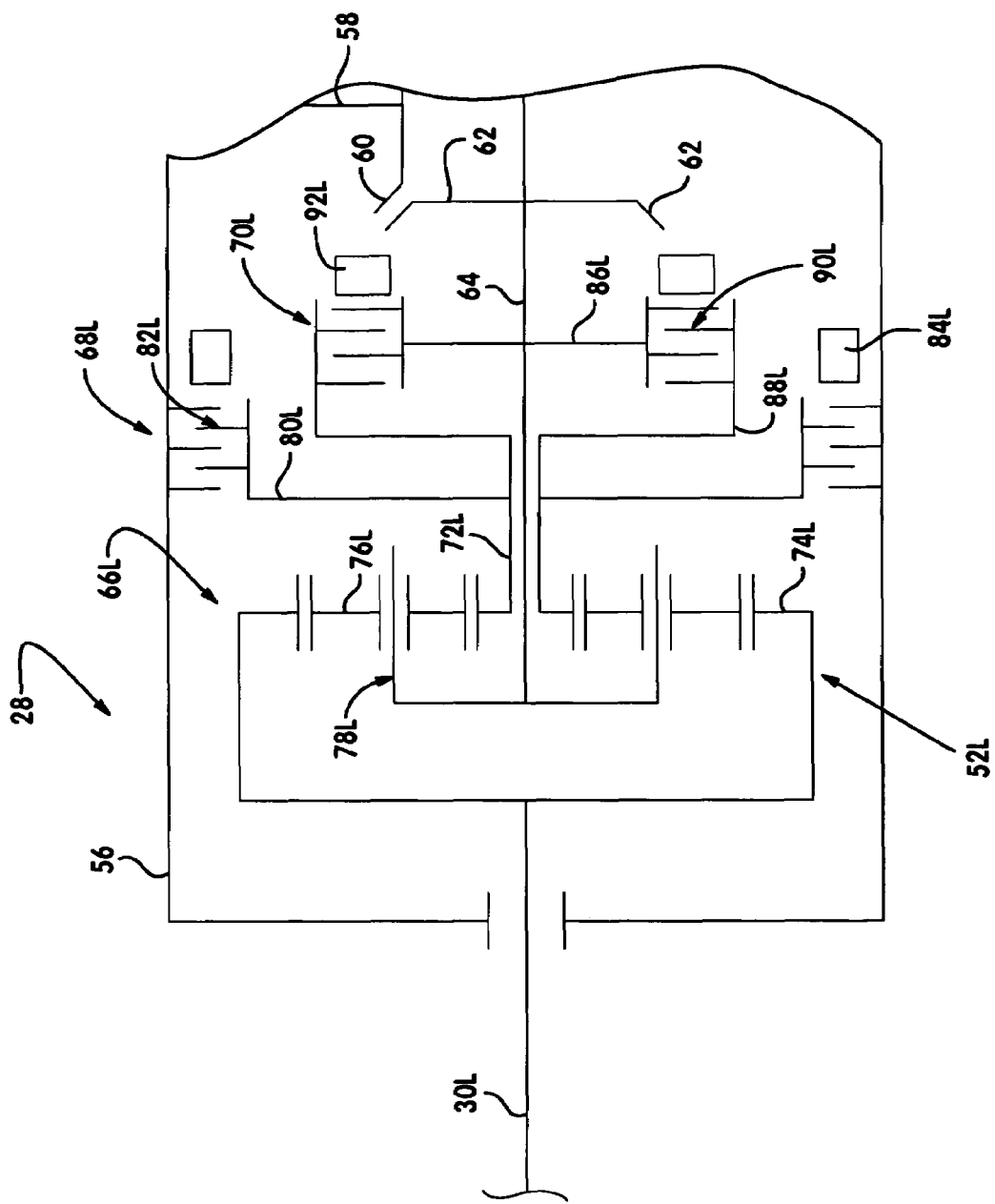
FIGS. 3A and 3B are enlarged portions of FIG. 2 showing the components of the left and right drive units associated with a torque vectoring drive mechanism that is integrated into the drive axle assembly.

Referring to FIGS. 2 and 3A, left drive unit 52L is shown to generally include a planetary gearset 66L, a first mode clutch 68L, and a second mode clutch 70L. Planetary gearset 66L has a sun gear 72L, a ring gear 74L, and a plurality of planet gears 76L meshed therewith which are rotatably supported from a planet carrier 78L. As seen, planet carrier 78L is fixed for rotation with transfer shaft 64 so as to act as the input member of gearset 66L while ring gear 74L is fixed for rotation with axleshaft 30L so as to act as the output member of gearset 66L.

First mode clutch 68L is operably arranged between sun gear 72L and casing 56 and acts as a brake device. First mode clutch 68L includes a clutch hub 80L fixed for rotation with sun gear 72L, a multi-plate clutch pack 82L disposed between hub 80L and casing 56, and a power-operated actuator 84L. First mode clutch 68L is operable in a first or "released" mode so as to permit unrestricted rotation of sun gear 72L such that no drive torque is transferred from transfer shaft 64 through gearset 66L to left axleshaft 30L. In contrast, first mode clutch 68L is also operable in a second or "locked" mode for preventing rotation of sun gear 72L such that left axleshaft 30L is overdriven relative to transfer shaft 64 at an increased speed ratio that is established by the meshed gear components of planetary gearset 66L. First mode clutch 68L is shifted between its released and locked modes via actuation of power-operated actuator 84L in response to control signals from ECU 36. In particular, first mode clutch 68L is operable in its released mode when power-operated actuator 84L applies a minimum clutch engagement force on clutch pack 82L and is further operable in its locked mode when actuator 84L applies a maximum clutch engagement force on clutch pack 82L.

Second mode clutch 70L is shown to be operably arranged between sun gear 72L and transfer shaft 64. Second mode clutch 70L includes a clutch hub 86L fixed for rotation with transfer shaft 64, a clutch drum 88L fixed for rotation with sun gear 72L, a multi-plate clutch pack 90L operably disposed between hub 86L and drum 88L, and a power-operated actuator 92L. Second mode clutch 70L is operable in a first or "released" mode to permit unrestricted rotation of sun gear 72L relative to transfer shaft 64 such that no drive torque is transferred from transfer shaft 64 through planetary gearset 66L to left axleshaft 30L. In contrast, second mode clutch 70L is also operable in a second or "locked" mode for preventing relative rotation between sun gear 72L and transfer shaft 64, thereby locking planetary gearset 66L and establishing a direct speed ratio drive connection between transfer shaft 64 and left axleshaft 30L. Second mode clutch 70L is also shifted between its released and locked modes via actuation of power-operated actuator 92L in response to control signals from ECU 36. Specifically, second mode clutch 70L is operable in its released mode when power-operated actuator 92L applies a minimum clutch engagement force on clutch pack 90L and is further operable in its locked mode when actuator 92L applies a maximum clutch engagement force on clutch pack 90L.

Figure 3B:
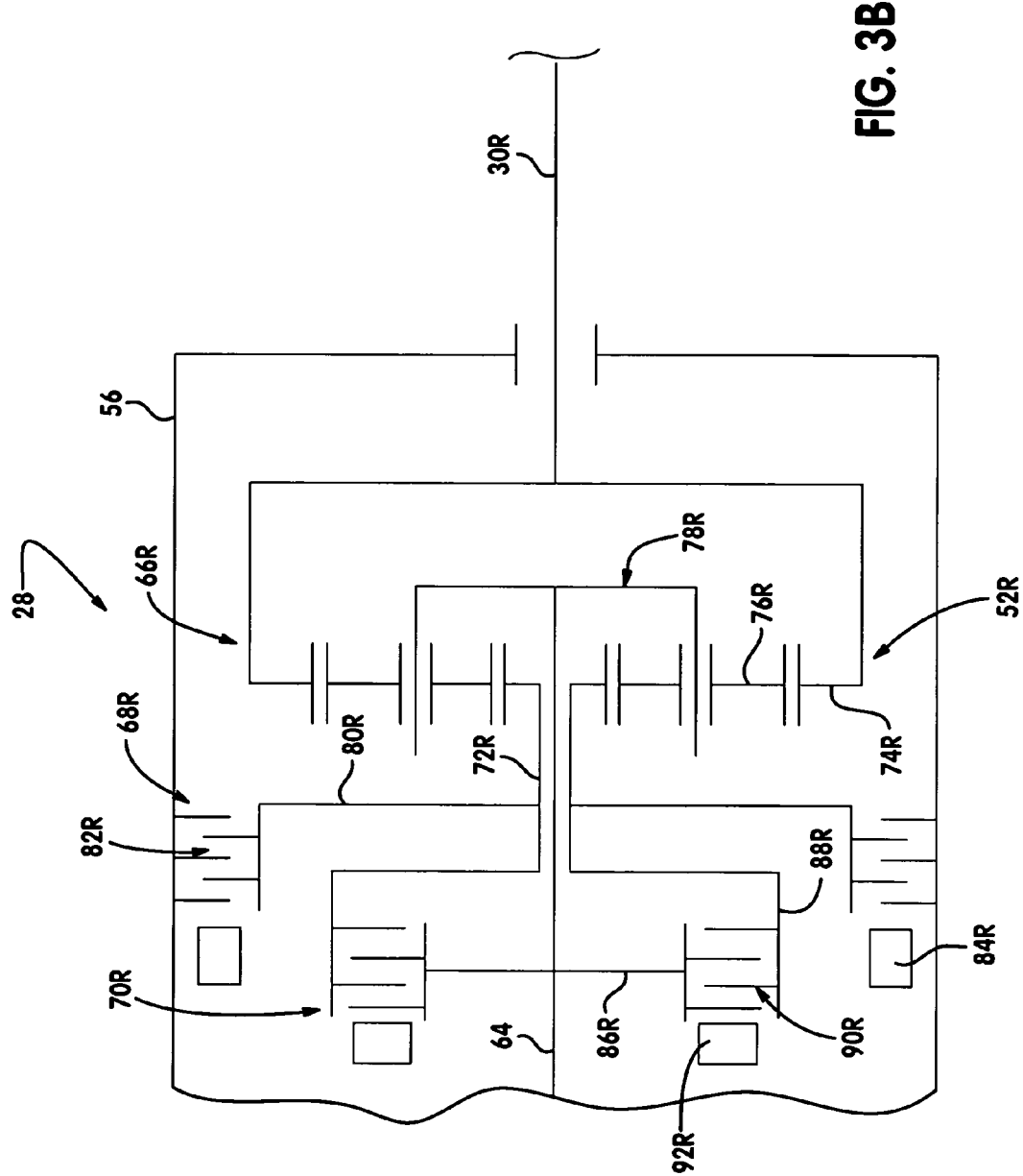

Referring to FIG. 3B, the components of right drive unit 52R are shown to basically be identical to those of left drive unit 52L and include a planetary gearset 66R, a third mode clutch 68R, and a fourth mode clutch 70R. Third mode clutch 68R includes a hub 80R fixed for rotation with sun gear 72R, a multi-plate clutch pack 82R, and a power-operated actuator 84R. Third mode clutch 68R is operable in a first or "released" mode to prevent unrestricted rotation of sun gear 72R such that no drive torque is transferred from transfer shaft 64 to right axleshaft 30R. In contrast, third mode clutch 68R is also operable in a second or "locked" mode for preventing rotation of sun gear 72R such that right axleshaft 30R is overdriven relative to transfer shaft 64 at an increased speed ratio established by gearset 66R. Power-operated actuator 84R is operable to shift third mode clutch 68R between its released and locked modes in response to control signals from ECU 36. In particular, third mode clutch 68R is operable in its released mode when clutch actuator 84R applies a minimum clutch engagement force on clutch pack 82R and is further operable in its locked mode when clutch actuator 84R applies a maximum clutch engagement force on clutch pack 82R.

Fourth mode clutch 70R is operably arranged between sun gear 72R and transfer shaft 64 and includes a hub 86R driven by transfer shaft 64, a drum 88R fixed for rotation with sun gear 72R, a clutch pack 90R, and a power-operated actuator 92R. Fourth mode clutch 70R is operable in a first or "released" mode to permit unrestricted rotation of sun gear 72R relative to transfer shaft 64 such that no drive torque is transmitted from transfer shaft 64 to right axleshaft 30R through planetary gearset 66R. In contrast, fourth mode clutch 70R is operable in a second or "locked" mode for preventing relative rotation between sun gear 72R and transfer shaft 64, thereby locking gearset 66R and establishing a direct speed ratio drive connection between transfer shaft 64 and right axleshaft 30R. Fourth mode clutch 70R is also shifted between its released and locked modes via actuation of power-operated actuator 92R in response to control signals from ECU 36. Specifically, fourth mode clutch 70R is operable in its released mode when power-operated actuator 92R applies a minimum clutch engagement force on clutch pack 90R and is further operable in its locked mode when actuator 92R applies a maximum clutch engagement force on clutch pack 90R.

Figure 4:
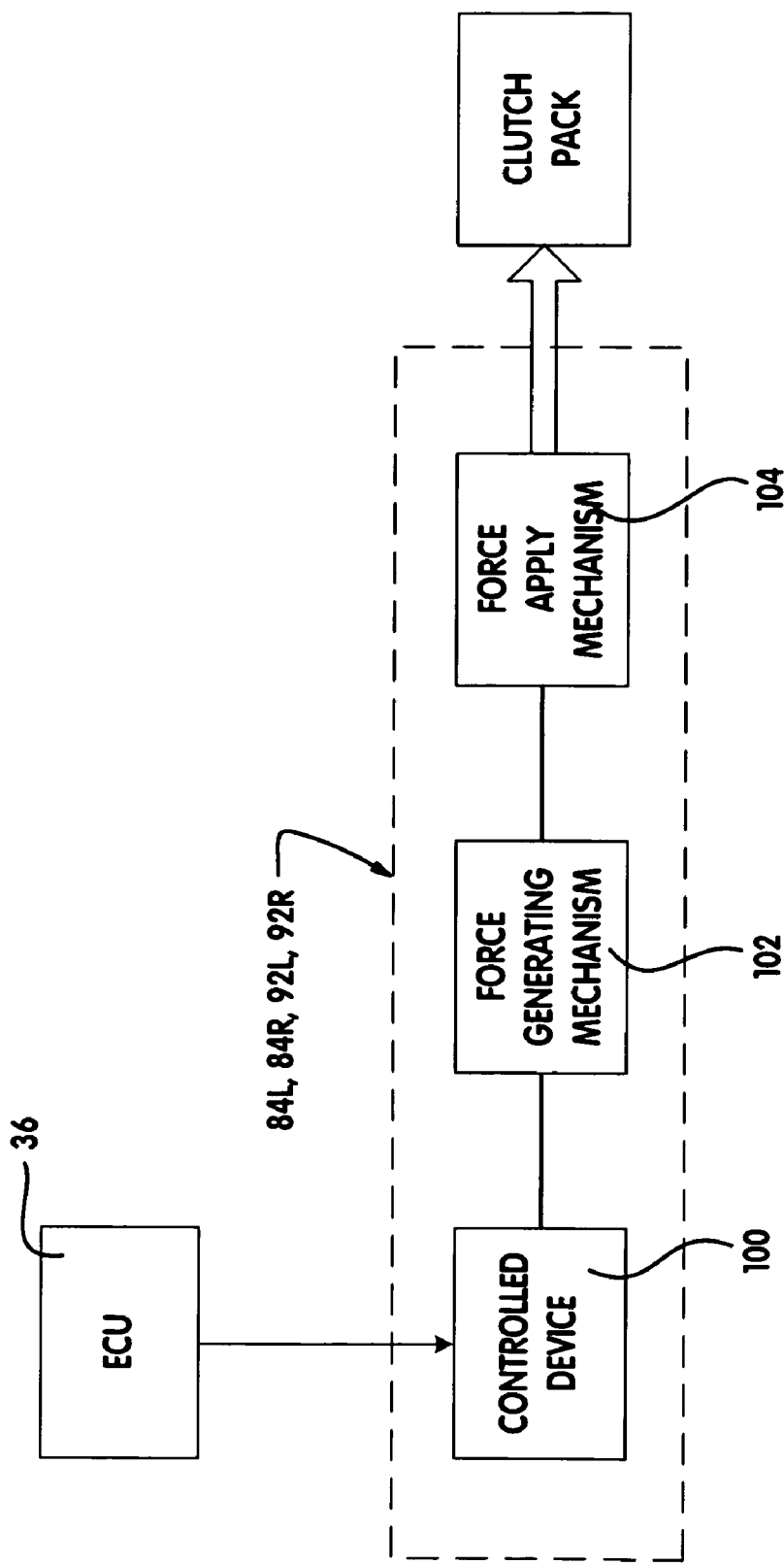
FIG. 4 is a diagrammatical illustration of a power-operated actuators associated with the drive units of the present invention.

As seen, power-operated actuators 84L, 84R, 92L and 92R are shown in schematic fashion to cumulatively represent the components required to accept a control signal from ECU 36 and generate a clutch engagement force to be applied to its corresponding clutch pack. To this end, FIG. 4 diagrammatically illustrates the basic components associated with such power-operated clutch actuators. Specifically, each power-operated actuator includes a controlled device 100, a force generating mechanism 102, and a force apply mechanism 104. In electro-mechanical systems, controlled device 100 would represent such components as, for example, an electric motor or an electromagnetic solenoid assembly capable of receiving an electric control signal from ECU 36. The output of controlled device 100 would drive a force generating mechanism 102 comprised of, for example, a ball ramp, a ball screw, a leadscrew, a pivotal lever arm, cam plates, etc., capable of converting the output into a clutch engagement force. Finally, force apply mechanism 104 functions to transmit and exert the clutch engagement force generated by force generating mechanism 102 onto the clutch pack and can include, for example, an apply plate or a thrust plate. If a hydra-mechanical system is used, controlled device 100 would be a flow or pressure control valve operable for delivering pressurized fluid from a fluid source to a piston chamber. A piston disposed for movement in the piston chamber would act as force generating mechanism 102. Preferably, controlled device 100 is also capable of receiving variable electric control signals from ECU 36 for permitting modulation of the magnitude of the clutch engagement force generated and applied to the clutch packs so as to permit "adaptive" control of the mode clutches.

In accordance with the arrangement shown, drive mechanism 28 is operable in coordination with yaw control system 34 to establish at a least nine distinct operative modes for controlling the transfer of drive torque from input shaft 58 to axleshafts 30L and 30R. To this end, each of the nine distinct operative modes will now be described, with the table provided in FIG. 5 depicting the operational status of each of the mode clutches required to establish each drive mode.

A first operative drive mode is established when first mode clutch 68L is in its locked mode and each of the second, third and fourth mode clutches are in their released mode. As such, right drive unit 52R is disconnected such that no drive torque is delivered from transfer shaft 64 to right axleshaft 30R while left drive unit 52L causes left axleshaft 30L to be overdriven relative to transfer shaft 64. When this drive mode is selected, right rear wheel 32R is free to rotate relative to left rear wheel 32L which, in turn, is being overdriven in relation to transfer shaft 64.

A second operative drive mode is established with second mode clutch 70L in its locked state and all of the other mode clutches in their released modes. In this drive mode, left drive unit 52L causes left axleshaft 30L to be commonly driven at a direct speed ratio with transfer shaft 64 while right drive unit 52R is disconnected such that no drive torque is transmitted from transfer shaft 64 to right axleshaft 30R. This drive mode is similar to the first drive mode except that left rear wheel 32L is being directly driven instead of overdriven relative to the rotary speed of transfer shaft 64.

A third operative drive mode is established when first mode clutch 68L and fourth mode clutch 70R are shifted into their locked modes while second mode clutch 70L and third mode clutch 68R are shifted into their released modes. In this third drive mode, left drive unit 52L functions to overdrive left axleshaft 30L relative to transfer shaft 64 while right drive unit 52R couples right axleshaft 30R for common rotation with transfer shaft 64. Thus, unequal drive torque is being delivered to rear wheels 32L and 32R with left rear wheel 32L being overdriven relative to right rear wheel 32R.

To establish the fourth operative drive mode, first mode clutch 68L and third mode clutch 68R are shifted into their locked modes while second mode clutch 70L and fourth mode clutch 70R are shifted into their released modes. In this fourth drive mode, both drive units are engaged such that each gearset 66L and 66R functions to overdrive its corresponding axleshaft 30L and 30R relative to the rotary speed of transfer shaft 64. In essence, this mode establishes a locked four-wheel overdrive mode since rear wheels 32L and 32R are being overdriven relative to front wheels 20L and 20R. Preferably, the gear ratios established by gearsets 66L and 66R are identical.

To establish the fifth operative drive mode, second mode clutch 70L and fourth mode clutch 70R are shifted into their locked modes while first and third mode clutches 68L and 68R are shifted into their released modes. In this fifth drive mode, left drive unit 52L couples left axleshaft 30L for common rotation with transfer shaft 64 while right drive unit 52R similarly couples right axleshaft 30R for common rotation with transfer shaft 64. As such, a locked four-wheel direct drive mode is established since rear wheels 32L and 32R are commonly driven.

The sixth operative drive mode is established with third mode clutch 68R shifted into its locked mode while all of the other mode clutches are shifted into their released modes. As such, left drive unit 52L is disconnected such that no drive torque is transferred to left axleshaft 30L while right drive unit 52R functions to overdrive axleshaft 30R relative to transfer shaft 64.

The seventh operative drive mode is established when fourth mode clutch 70R is locked and all of the other mode clutches are released. As such, right drive unit 52R functions to couple axleshaft 30R for direct rotation with transfer shaft 64 while left drive unit 52L is disconnected such that no drive torque is transmitted to left axleshaft 30L.

The eight drive mode is established when second mode clutch 70L and third mode clutch 68R are locked and first mode clutch 68L and fourth mode clutch 70R are released. Thus, right drive unit 52R functions to overdrive right axleshaft 30R while left drive unit 52L drives left axleshaft 30L at the same rotary speed as transfer shaft 64.

The ninth drive mode establishes an "open" differential mode wherein all four of the mode clutches are in their released mode such that no drive torque is transferred from input shaft 50 to either of axleshafts 30L and 30R so as to permit unrestricted relative rotation between rear wheels 32L and 32R with no drive torque delivered thereto.

At the start of vehicle 10, power from engine 12 is transmitted to front wheels 20L and 20R through transmission 14 and front differential 16. This drive torque is also transmitted to drive mechanism 28 through PTU 22 and propshaft 24 for rotatably driving input pinion shaft 58. Typically, drive units 52L and 52R would be non-engaged such that no drive torque is transmitted from driven transfer shaft 64 to either of rear wheels 32L and 32R. However, upon detection of lost traction at front wheels 20L and 20R, drive units 52L and 52R can be engaged to provide drive torque to rear wheels 32L and 32R based on the tractive needs of the vehicles.

In addition to on-off control of the mode clutches to establish the various drive modes associated with direct or overdrive connections through the planetary gearsets, it is further contemplated that variable clutch engagement forces can be generated by the power-operated actuators to adaptively control left-to-right speed and torque characteristics. This adaptive control feature functions to provide enhanced yaw and stability control for vehicle 10. For example, a "reference" yaw rate can be determined based on the steering angle detected by steering angle sensor 42, a vehicle speed calculated based on signals from the various speed sensors, and a lateral acceleration detected by lateral acceleration sensor 48 during turning of vehicle 10. ECU 36 compares this reference yaw rate with an "actual" yaw rate detected by yaw sensor 46. This comparison will determine whether vehicle 10 is in an understeer or an oversteer condition so as to permit yaw control system 34 to accurately adjust or accommodate for these types of steering tendencies. ECU 36 can address such conditions by shifting drive mechanism 28 into the specific operative drive mode that is best suited to correct the actual or anticipated oversteer or understeer situation. Optionally, variable control of the mode clutches also permits adaptive regulation of the side-to-side torque and speed characteristics if one of the distinct drive modes is not adequate to accommodate the current steer tractive condition.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle, comprising:
a powertrain operable for generating drive torque;
a primary driveline for transmitting drive torque from said powertrain to first and second primary wheels;
a secondary driveline for selectively transmitting drive torque from said powertrain to first and second secondary wheels, said secondary driveline including an input shaft driven by said powertrain, a first axleshaft driving said first secondary wheel, a second axleshaft driving said second secondary wheel, and a drive mechanism for selectively coupling said input shaft to one or both of said first and second axleshafts, said drive mechanism including a transfer shaft driven by said input shaft and first and second drive units operably disposed between said transfer shaft and said first and second axleshafts, said first drive unit including a first planetary gearset and first and second mode clutches, said first planetary gearset including a first carrier driven by said transfer shaft, a first sun gear, a first ring gear driving said first axleshaft, and a set of first planet gears meshed with said first sun gear and said first ring gear and which are rotatably supported from said first carrier, said first mode clutch is operable to selectively brake rotation of said first sun gear and said second mode clutch is operable to selectively couple said first sun gear for rotation with said first carrier, said second drive unit including a second planetary gearset and third and fourth mode clutches, said second planetary gearset including a second carrier driven by said transfer shaft, a second sun gear, a second ring gear driving said second axleshaft, and a set of second planet gears meshed with said second sun gear and said second ring gear and which are rotatably supported from said second carrier, said third mode clutch is operable to selectively brake rotation of said second sun gear and said fourth mode clutch is operable to selectively couple said second sun gear for rotation with said second carrier; and
a control system for controlling actuation of said mode clutches.

2. The motor vehicle of claim 1 wherein said drive mechanism is operable to establish a first overdrive mode when said first mode clutch is engaged and each of said second, third and fourth mode clutches are released such that said first axleshaft is overdriven relative to said transfer shaft and said second axleshaft is uncoupled from driven connection with said transfer shaft.

3. The motor vehicle of claim 2 wherein said drive mechanism is operable to establish a second overdrive mode when said third mode clutch is engaged and each of said first, second and fourth mode clutches are released such that said second axleshaft is overdriven relative to said transfer shaft and said first axleshaft is uncoupled from driven connection with said transfer shaft.

4. The motor vehicle of claim 3 wherein said drive mechanism is operable to establish a third overdrive mode when said first and third mode clutches are engaged and said second and fourth mode clutches are released such that both of said first and second axleshafts are overdriven relative to said transfer shaft.

5. The motor vehicle of claim 1 wherein said drive mechanism is operable to establish a first drive mode when said second mode clutch is engaged and each of said first, third and fourth mode clutches are released such that said first axleshaft is driven by said transfer shaft while said second axleshaft is uncoupled from driven connection to said transfer shaft.

6. The motor vehicle of claim 5 wherein said drive mechanism is operable to establish a second drive mode when said fourth mode clutch is engaged and each of said first, second and third mode clutches are released such that said second axleshaft is driven relative to said transfer shaft while said first axleshaft is uncoupled from driven connection with said transfer shaft.

7. The motor vehicle of claim 6 wherein said drive mechanism is operable to establish a third drive mode when said second and fourth mode clutches are engaged and said first and third mode clutches are released such that both of said first and second axleshafts are driven by said transfer shaft.

8. A drive axle assembly for use in a motor vehicle having a powertrain and a first and second wheels, comprising:
an input shaft driven by the powertrain;
a first axleshaft driving the first wheel;
a second axleshaft driving the second wheel;
a transfer shaft driven by said input shaft;
a first drive unit operably disposed between said transfer shaft and said first axleshaft, said first drive unit including a first planetary gearset and first and second mode clutches, said first planetary gearset including a first carrier driven by said transfer shaft, a first sun gear, a first ring gear driving said first axleshaft, and a set of first planet gears meshed with said first sun gear and said first ring gear and which are rotatably supported from said first carrier, said first mode clutch is operable to selectively brake rotation of said first sun gear and said second mode clutch is operable to selectively couple said first sun gear for rotation with said first carrier;
a second drive unit operably disposed between said transfer shaft and said second axleshaft, said second drive unit including a second planetary gearset and third and fourth mode clutches, said second planetary gearset including a second carrier driven by said transfer shaft, a second sun gear, a second ring gear driving said second axleshaft, and a set of second planet gears meshed with said second sun gear and said second ring gear and which are rotatably supported from said second carrier, said third mode clutch is operable to selectively couple said second sun gear for rotation with said second carrier; and a control system for controlling actuation of said mode clutches.

9. The drive axle assembly of claim 8 wherein a first overdrive mode is established when said first mode clutch is engaged and each of said second, third and fourth mode clutches are released such that said first axleshaft is overdriven relative to said transfer shaft while said second axleshaft is uncoupled from driven connection with said transfer shaft.

10. The drive axle assembly of claim 9 wherein a second overdrive mode is established when said third mode clutch is engaged and each of said first, second and fourth mode clutches are released such that said second axleshaft is overdriven relative to said transfer shaft while said first axleshaft is uncoupled from driven connection with said transfer shaft.

11. The drive axle assembly of claim 10 wherein a third overdrive mode is established when said first and third mode clutches are engaged and said second and fourth mode clutches are released such that both of said first and second axleshafts are overdriven relative to said transfer shaft.

12. The drive axle assembly of claim 8 wherein a first drive mode is established when said second mode clutch is engaged and each of said first, third and fourth mode clutches are released such that said first axleshaft is driven by said transfer shaft while said second axleshaft is uncoupled from driven connection to said transfer shaft.

13. The drive axle assembly of claim 12 wherein a second drive mode is established when said fourth mode clutch is engaged and each of said first, second and third mode clutches are released such that said second axleshaft is driven relative to said transfer shaft while said first axleshaft is uncoupled from driven connection with said transfer shaft.

14. The drive axle assembly of claim 13 wherein a third drive mode is established when said second and fourth mode clutches are engaged and said first and third mode clutches are released such that both of said first and second axleshafts are driven by said transfer shaft.

* * * * *